Dec. 27, 1955 B. D. LOUGHLIN 2,728,813
COLOR-SIGNAL DETECTION SYSTEM
Original Filed May 1, 1950
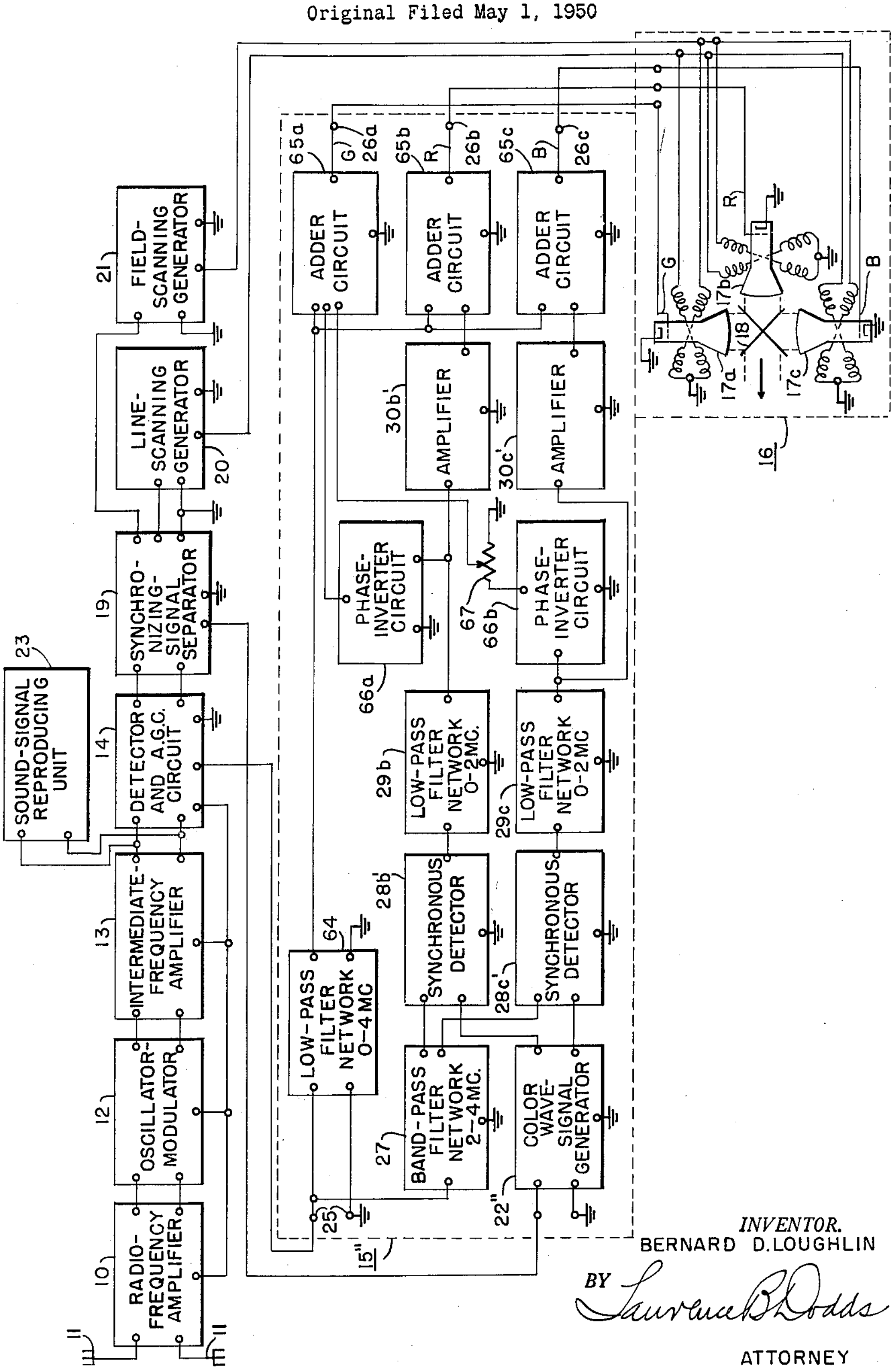
INVENTOR.
BERNARD D. LOUGHLIN
BY Laurence B. Dodds
ATTORNEY United States Patent Office 2,728,813
Patented Dec. 27, 1955

2,728,813

COLOR-SIGNAL DETECTION SYSTEM

Bernard D. Loughlin, Lynbrook, N. Y., assignor to Hazeltine Research, Inc., Chicago, Ill., a corporation of Illinois Original application May 1, 1950, Serial No. 159,212. Divided and this application July 8, 1952, Serial No. 297,739

11 Claims. (Cl. 178—5.4)

*General*

The present invention relates, in general, to color-signal detection systems for color-television receivers of a three-color television system and, particularly, to such detection systems in television systems which translate brightness information as one signal and chromaticity information as modulation components of a subcarrier wave signal. The present application is a divisional application of applicant's copending application Serial No. 159,212, filed May 1, 1950, and entitled "Color-Television System."

In a form of a color-television system, as more fully described in the application previously referred to, color signals individually representative of the primary colors, specifically, green, red, and blue, of a color image being televised are developed at a transmitter. Components of these color signals are applied as modulation signals to a subcarrier wave signal effectively to multiplex-modulate the wave signal by developing in a predetermined phase sequence at different phase points thereof modulation components individually representative of the primary color signals. Conventionally, the modulated subcarrier wave signal has a predetermined mean frequency within the video-frequency range and has amplitude and phase charactersitics related to the primary colors of the televised image. In a specific form of such color-television system the subcarrier wave signal is effectively modulated at 120° phase intervals by successive ones of the three color signals. In another specific form of such color-television system the subcarrier wave signal may be effectively modulated at 0°, 180°, and 270° by different ones of the three color signals. In addition to the modulated subcarrier wave signal, a signal representative of the brightness of the image, in other words a signal including the detail information of the image in terms of shades of black and white, is also developed at the transmitter. The multiplex-modulated subcarrier wave signal, effectively comprising the chromaticity information, and the brightness signal, effectively comprising the brightness and detail information of the televised image, are combined in an interleaved manner to form in a pass band common to both signals a resultant video-frequency signal which is transmitted in a conventional manner.

A color-television receiver in such color-television system intercepts the transmitted signal and initially the video-frequency detector derives therefrom the modulated subcarrier wave signal and the brightness signal, in a conventional manner, as components of a video-frequency signal. The brightness signal has many of the characteristics of a conventional monochrome signal and is conventionally applied directly to one of the beam-intensity control circuits of a picture tube. The modulated subcarrier wave signal is applied to a color-signal detection system to which there is also applied a locally generated signal having a frequency equal to the mean frequency of the subcarrier wave signal and having a phase related in phase therewith. A number of color-signal detection devices respond jointly to the locally generated signal and the modulated subcarrier wave signal individually to derive from the subcarrier wave signal signals representative of different ones of the three primary colors utilized in the color-television system. The derived signals repersentative of the chromaticity of the televised image are then individually combined with the brightness signal to develop in the picture tube a color reproduction of the televised image.

Color-television receivers of the type just described normally include conventional radio-frequency and intermediate-frequency amplifier sections and a conventional detector for deriving video-frequency signals including the brightness and chromaticity information. Such receivers differ from the conventional monochrome receivers in the design of that portion of the receiver following the video-frequency signal detector. In addition to other circuits which need not be considered in detail for the purposes of the present invention, the portion of the receiver to which reference has just been made includes the color-signal detection devices, previously mentioned herein, and which in combination with one another comprise a color-signal detection system. The present invention is particularly directed to new and improved such detection systems.

As previously mentioned, a number of these color-signal detection devices are utilized for deriving the chromaticity information from the multiplex-modulated subcarrier wave signal. In three-color television receivers where the chromaticity of an image is represented by signals individually representative of three primary colors, three color-signal detection devices for deriving three signals individually representative of the three primary colors are conventionally employed. These three signals and the signal representative of brightness comprise four components of information which are utilized to provide the complete color information for the three primary colors. Since a composite color composed of three primary colors is capable of being defined by information relating to the brightness, hue, and color saturation thereof, it appears more desirable and more economical to develop only three independent components of information to define a composite color in place of the four components derived in previous receivers. Since a color-television receiver of the type previously described herein derives a signal representative of brightness, it appears desirable to utilize in such a receiver a color-signal detection system which will derive two signals which define the chromaticity of the image and which in combination with the brightness signal will define the composite colors of a reproduced color image. Such a color-signal detection system will utilize less components and, therefore, be more economical to manufacture than prior such detection systems. Therefore, the present invention is directed to a color-signal detection system which derives only two independent signals representative of the chromaticity of a televised image.

It is, therefore, an object of the present invention to provide a new and improved color-signal detection system for a color-television receiver which avoids the aforementioned disadvantages of prior color-signal detection systems.

It is another object of the present invention to provide a new and improved color-signal detection system for a color-television receiver in which relatively few color-signal detection devices are utilized to derive the color information.

It is still another object of the present invention to provide a new and improved color-signal detection system for a three-color television receiver in which only two color-signal detection devices are employed to derive all of the color information.

It is still a further object of the present invention to provide a color-signal detection system for a three-color television receiver which is simple, economical, and utilizes a relatively small number of circuit components.

In accordance with the present invention, a color-signal detection system for a three-color television receiver comprises a first circuit for supplying a signal primarily representative of the brightness of a televised color image, and a second circuit for supplying a wave signal effectively having amplitude-modulation components at different phase points thereof representative of individual ones of signals defining the chromaticity of the image. The detection system also includes a signal generator for developing a signal having a frequency which is an integral multiple of the frequency of the aforementioned wave signal and a signal-detection apparatus including as detectors of the modulation components of the wave signal only two signal-detection devices for deriving from the wave signal different modulation components which substantially completely define the chromaticity of the image. The signal-detection apparatus includes a signal-translating system coupled to the second circuit for applying the wave signal to the signal-detection devices and a signal-translating system coupled to the generator for applying the above-mentioned generated signal to these devices. The signal-translating systems have different signal-translating characteristics for causing the phase of the signals translated therethrough to be so modified that the aforesaid generated signal is in phase with a predetermined phase of the wave signal as applied to one of the devices and is substantially in quadrature phase with this predetermined phase of the wave signal as applied to the other of the devices, whereby the different modulation components are individually derived substantially from quadrature phase points of the wave signal. Finally, the color-signal detection system comprises a signal-combining means responsive jointly to the brightness signal and the derived modulation components for developing at least three effects for use by a three-color display of a three-color television receiver.

For a better understanding of the present invention, together with other and further objects thereof, reference is had to the following description taken in connection with the accompanying drawing, and its scope will be pointed out in the appended claims.

In the drawing, the figure is a schematic diagram of a three-color television receiver including a color-signal detection system embodying the invention in one form.

*General description of the three-color television receiver*

Referring to the drawing, there is represented a color-television receiver embodying a color-signal detection system in accordance with one form of the present invention and comprising portions of Fig. 1 and Fig. 5 of the aforesaid copending application of which this application is a division. The receiver is of a constant-luminance type as described in the copending application previously referred to. In other words, it is of a type wherein the monochrome or brightness signal determines the brightness of the image, while the chromaticity signals determine only color and do not affect brightness. The receiver represented also is of a type which utilizes information representative of the relative proportions of three primary colors to be combined to reproduce a color image and is, therefore, designated a three-color television receiver. The receiver includes a radio-frequency amplifier 10 of any desired number of stages having its input circuit connected to an antenna system 11, 11. Coupled in cascade with the output circuit of the amplifier 10, in the order named, are an oscillator-modulator 12, an intermediate-frequency amplifier 13 of one or more stages, a detector and automatic-gain-control (AGC) circuit 14, and a signal-translating system including a color-signal detection system 15″, to be described in more detail hereinafter, and a color image-reproducing apparatus 16 of the cathode-ray tube type.

As explained more fully in the copending application previously referred to herein, the apparatus 16 comprises cathode-ray tubes 17*a*, 17*b*, 17*c* individually arranged to respond, respectively, to signals developed in the output circuits of the unit 15″ representative of the green, red, and blue colors of the image being televised. In other words, the tubes 17*a*, 17*b*, and 17*c* are arranged to develop, respectively, green, red, and blue images on the respective image screens thereof. The axes of the tubes 17*a*, 17*b*, and 17*c* are physically positioned at right angular relationships with respect to each other, and an optical system 18, which may consist of a well-known dichroic mirror type arrangement, is so positioned as optically to combine the images on the screens of the cathode-ray tubes 17*a*, 17*b*, and 17*c* into a color reproduction of the televised color image. Conventional beam-deflecting windings are associated with each cathode-ray tube.

There is also coupled to the detector 14 a synchronizing-signal separator 19 having output circuits coupled through a line-scanning generator 20 and a field-scanning generator 21 to each of the beam-deflecting windings of the cathode-ray tubes 17*a*, 17*b*, and 17*c*. An output circuit of the separator 19 is also connected to a color wave-signal generator 22″ in the system 15″.

The output circuit of the AGC supply included in the unit 14 is connected to the input circuits of one or more of the tubes of the radio-frequency amplifier 10, the oscillator-modulator 12, and the intermediate-frequency amplifier 13 in a well-known manner. A sound-signal reproducing unit 23 is also connected to the output circuit of the intermediate-frequency amplifier 13 and may include one or more stages of intermediate-frequency amplification, a sound-signal detector, one or more stages of audio-frequency amplification, and a sound-reproducing device.

It will be understood that the various units thus far described with respect to the receiver represented in the drawing, with the exception of the color-signal detection system 15″, correspond to units described in Fig. 1 of the aforesaid copending application and may have any conventional construction and design, the details of such units being well known in the art, thus rendering a further description thereof unnecessary.

*General operation of the television receiver*

Considering briefly the operation of the receiver of Fig. 1 as a whole, and assuming for the moment that the unit 15″ is a means for developing separate signals representative, respectively, of the green, red, and blue colors of the image being reproduced, the desired television signal is intercepted by the antenna 11 and selected and amplified in the radio-frequency amplifier 10. The latter signal is then applied to the oscillator-modulator 12 wherein it is converted into an intermediate-frequency signal which is then selectively amplified in the amplifier 13 and supplied to the detector 14 wherein its modulation components are derived. The derived composite video-frequency components are applied to the system 15″ wherein signals representative of the green, red, and blue colors of the televised image are derived from the applied signal. Individual ones of the derived color signals are applied to different ones of the control electrodes of the cathode-ray tubes 17*a*, 17*b*, and 17*c* in the unit 16 to modulate the intensity of the electron beams in these tubes. The synchronizing-signal components of the received signal are separated from the video-frequency components in the unit 19 and are utilized to synchronize the operation of the line-scanning and field-scanning generators 20 and 21. These generators supply signals of saw-tooth wave form which are properly phased with reference to the transmitted television signal and which are applied to the deflection windings of the cathode-ray tubes 17*a*–17*c*, inclusive, in the unit 16, thereby to deflect the cathode-ray beams in each tube in two directions normal to each other. There is thus reproduced on the image screens of the tubes 17a, 17b, and 17c, respectively, green, red, and blue images representative of the respective primary colors of the image being televised at the transmitter. The dichroic mirror arrangement 18 optically combines the green, red, and blue images on the several image screens and presents the complete reproduced color image to the observer.

The automatic-gain-control or AGC signal derived in the unit 14 is effective to control the amplification of one or more of the units 10, 12, and 13 to maintain the signal applied to the detector 14 and to the sound-signal reproducing unit 23 within a relatively narrow range for a wide range of received signal intensities.

The sound-signal modulated wave signal accompanying the desired television signal is also intercepted by the antenna system 11, 11 and, after amplification in the amplifier 10 and conversion to an intermediate-frequency signal in the unit 12, it is further amplified in the amplifier 13 and applied to the sound-signal reproducing unit 23. In the unit 23 it is amplified and the sound-signal modulation components derived. The latter components are further amplified by the reproducing device in a conventional manner.

*Description of color-signal detection system* 15″

Referring now in particular to the color-signal detection system 15″, this system corresponds to the system described with reference to Fig. 5 of the aforesaid copending application and comprises a first circuit for supplying a signal primarily representative of the brightness of a televised color image. Specifically, this first circuit includes a 0–4 megacycle low-pass filter network 64 coupled between the terminals 25, 25 and an input circuit of each of adder circuits 65a, 65b, and 65c. The color-signal detection system 15″ also includes a second circuit for supplying a wave signal effectively having amplitude-modulation components at different phase points thereof representative of individual ones of signals defining the chromaticity of the televised image. Specifically, the second circuit comprises a 2–4 megacycle band-pass filter network 27 coupled between the input terminals 25, 25 and an input circuit in each of a pair of synchronous detectors 28b′ and 28c′ for applying to the latter detectors a 3.5 megacycle subcarrier wave signal modulated by color-signal components representative of green, red, and blue of a televised image.

The system 15″ also includes a generator for developing a signal having a frequency which is an integral multiple of the frequency of the modulated subcarrier wave signal, specifically, a color wave-signal generator 22″. The generator 22″ may be a conventional sine-wave generator including automatic-frequency-control circuits for developing a signal having a frequency of substantially 3.5 megacycles if the frequency of the subcarrier wave signal is 3.5 megacycles. Though not considered in detail herein, the frequency of the generator 22″ may in some embodiments be a harmonic of the subcarrier wave-signal frequency. An input circuit of the generator 22″, as previously mentioned, is connected to an output circuit of the separator 19 for application of a synchronizing signal thereto to control the operation thereof in synchronism with the operation of a corresponding generator in the transmitter.

The system 15″ also includes a signal-detection apparatus including as detectors for the modulation components of the subcarrier wave signal only two signal-detection devices, specifically the units 28b′ and 28c′, for deriving from the modulated wave signal different modulation components which substantially completely define the chromaticity of the image. The units 28b′ and 28c′ are essentially modulators for developing in the output circuits thereof frequency difference signals resulting from the heterodyning of the modulated subcarrier wave signal and the locally developed wave signal. The output circuit of the unit 28b′ is coupled through a 0–2 megacycle low-pass filter network 29b and an amplifier 30b′ to an input circuit of an adder circuit 65b, while the output circuit of the detector 28c′ is similarly coupled through a 0–2 megacycle filter network 29c and an amplifier 30c′ to an input circuit of an adder circuit 65c. The circuit elements of the amplifiers 30b′ and 30c′ are so proportioned that these amplifiers individually have gains complementary to gains in corresponding signal-translating channels at the transmitter in order to make the total gains of the separate channels for translating the signals representative of the color of an image from the transmitter through the receiver equal for all such channels. These gains are related to the constant-luminance correction employed at the receiver in the form of channel gains, as more fully explained hereinafter and in the aforesaid copending application. As described in that copending application, the gain of the channel for translating the signal representative of green can be considered to be unity or one. With relation to such gain the channel at the transmitter, for translating the signal representative of red may have a gain of $\frac{1}{2.23}$, and, also at the transmitter, the channel for translating the signal representative of blue may have approximately a gain of $\frac{1}{5}$. As one factor in the system under consideration to assure that all of the primary colors have the same brightness effects at the receiver so that the chromaticity signals control only the color and do not affect the brightness of the reproduced image and to cause the colors in the reproduced image faithfully to represent the colors in the televised image, the gain of the channel translating the signal representative of green is proportioned to be unity, that of the channel translating the signal representative of red is proportioned to be 2.23, and that of the channel translating the signal representative of blue is proportioned to be 5. Thus, if the total gain of each channel is considered to be in one unit in each channel, the amplifier 30b′ in the channel for translating the signal representative of red may be such a unit and is therefore proportioned to have a gain of 2.23. For a similar reason, the amplifier 30c′ is proportioned to have a gain of 5.

The signal-detection apparatus also includes a signal-translating system coupled to the aforesaid second circuit for applying the previously mentioned subcarrier wave signal to the devices 28b′ and 28c′, specifically, the two signal paths coupling an input circuit of each of the last-mentioned units to different ones of the output circuits of the filter network 27. Additionally, the signal-detection apparatus includes a signal-translating system coupled to the unit 22″ for applying the above-mentioned generated signal developed in the unit 22″ to the units 28b′ and 28c′ for effecting the derivation of the components of the subcarrier wave signal, specifically, two signal paths individually connecting different ones of separate output circuits of the generator 22″ to another input circuit of each of the detectors 28b′ and 28c′. At least one of the signal-translating systems for applying signals to the units 28b′ and 28c′ has circuit elements so proportioned for modifying the phase of the signals translated therethrough that the generated signal is in phase with a predetermined phase of the wave signal as applied to one of the devices 28b′, 28c′, and is substantially in quadrature phase with this predetermined phase of the wave signal as applied to the other of the devices 28b′, 28c′. For example, the signal path coupling an output circuit of the generator 22″ to an input circuit of the detector 28b′ may be considered to include circuit elements so proportioned that substantially no phase delay with respect to an arbitrary predetermined phase thereof occurs in translating a signal from the generator 22″ to the input circuit of the detector 28b′ coupled to the unit 22″, while the signal path coupling the generator 22″ to an input circuit of the detector 28c′ includes circuit elements at the latter input circuit that are so proportioned that the signal translated through the latter path is delayed by 90° in phase with respect to the above-mentioned predetermined phase. Though, in such example, the delay is considered as occurring with respect to the signal applied from the generator 22″ to the detector 28c′, it should be understood that the delay could equally well occur in one of the paths connecting the output circuit of the filter network 27 to the detectors 28b′ and 28c′. In the latter case, the signal applied to each of the last-mentioned detectors from the generator 22″ would have the same phase with respect to the predetermined phase. Additionally phase delays may occur both in the path from the generator 22″ to the detector 28c′ and the path from the network 27 to the same detector to cause the quadrature relationship of the signals applied to the detector 28c′ to occur. As described more fully in the aforesaid copending application, the detectors 28b′ and 28c′ are conventional units arranged to cause the signals applied thereto from the generator 22″ and the network 27 to heterodyne and develop signals representative of any frequency difference in the applied signals specifically caused by the modulation components of the subcarrier wave signal.

Finally, the system 15″ includes a signal-combining means responsive jointly to the brightness signal and the modulation components derived in the unit 15″ for developing at least three effects for use by a three-color display of a three-color television receiver. More specifically, such combining means includes the adder circuits 65a, 65b, and 65c, each having an output circuit coupled through terminals 26a, 26b, and 26c, respectively, to the control electrode circuits of the tubes 17a, 17b, and 17c, respectively, in the image-reproducing device 16. Each of the adder circuits 65a–65c, inclusive, has an input circuit coupled to the output circuit of the filter network 64. Additionally, the adder circuit 65a has an input circuit coupled through a phase-inverter circuit 66a to the output circuit of the filter network 29b and has another input circuit coupled through a voltage divider 67 and a phase-inverter circuit 66b to the output circuit of the filter network 29c. As will be explained more fully hereinafter, the phase inverters 66a and 66b are of a conventional type for inverting the phase of the signals in the output circuits of the networks 29b and 29c, respectively. The voltage divider 67 is proportioned to apply to the unit 65a a predetermined portion of the signal developed in the output circuit of the network 29c. The adder circuits may have any conventional design, for example, each may comprise a plurality of similar tubes having separate input circuits and a common output circuit.

*Explanation of operation of color-signal detection system*

In general, the received signal components derived in the detector 14 and representing the composite video-frequency signals, including brightness and color information, are applied to the terminals 25, 25 of the network 15″. The signals primarily representative of brightness and having frequencies of approximately 0–4 megacycles are translated through the filter network 64 and applied to the input circuits of the adder circuits 65a, 65b, and 65 c. The subcarrier wave signal having amplitude-modulation components at different phase points thereof representative of individual ones of the signals defining the chromaticity of the image and having, for example, a mean frequency of 3.5 megacycles, is translated through the band-pass filter network 27 and applied to input circuits of the detectors 28b′ and 28c′. The detectors 28b′ and 28c′ also have a locally generated 3.5 megacycle wave signal applied thereto from the generator 22″, that signal applied to the detector 28b′ from the unit 22″ being in quadrature with the signal applied from the same unit to the detector 28c′. The detectors 28b′ and 28c′ are effectively modulators, since the modulated subcarrier wave signal and the locally generated signal heterodyne in each detector to derive the low-frequency modulation components of the wave signal. The detector 28b′ develops an output signal representative of the modulation components at, for example, the 0 phase point of the subcarrier wave signal while the detector 28c′ develops output signals representative of the components, for example, at the 90° phase point of the subcarrier wave signal. These low-frequency components are then translated through the networks 29b and 29c, respectively, and the amplifiers 30b′ and 30c′, respectively, and applied to input circuits of the adder circuits 65b and 65c wherein they combine with the brightness signal to produce color signals representative of red and blue, respectively. As has previously been mentioned, the amplifier 30b′ has a gain of 2.23 with reference to a reference gain of the signal representative of green, whereas the amplifier 30c′ has a gain of 5 with reference to the reference gain. Thus, as explained in the aforesaid copending application, these gains are effective to cause the color signals developed in the output circuits of the adder circuits 65b and 65c faithfully to represent the red and blue colors, respectively, of the televised image. These gains together with the gain of the channel including the unit 65a for translating the signal representative of green and, as will be explained more fully hereinafter, the relative proportions of the signal components in the output circuits of the units 29b and 29c which combine to develop the signal representative of green, are effective to cause the signals representative of the chromaticity of the image to develop the color thereof while not affecting the brightness of the image.

As will be more fully understood from a consideration of signals of specific composition to be considered hereinafter, portions of the signals developed in the output circuits of the networks 29b and 29c are inverted in phase in the networks 66a and 66b, respectively, and applied to input circuits of the adder circuit 65a to develop in the output circuit of the latter unit the signal representative of green. The path through the system 15″ for the signal representative of green has an amplification factor of unity with respect to the amplification of the path for translating the brightness signal. The signal representative of green is then translated through the terminal 26a and applied to the control electrode circuit of the cathode-ray tube 17a.

Considering the general explanation of the operation of the system 15″ as presented above, it is apparent that three components of information are derived from the composite video-frequency signal by means of the two detection devices 28b′ and 28c′ and utilized to develop the three signals representative of the colors green, red, and blue in the image to be reproduced. Thus, the signal translated through the network 64 is representative of the brightness information of the image, while the signals translated through the networks 29b and 29c, having been derived from the subcarrier wave signal solely by the two detectors 28b′, 28c′, are collectively representative of the chromaticity or color information of the image. Specifically, the signal translated through the network 29b is a color difference signal R—Y representative of red while the signal translated through the network 29c is a color difference signal B—Y representative of blue where the letters R and B represent, respectively, red and blue and the letter Y represents the brightness signal. More detail with respect to these signals will be presented hereinafter. In addition to being representative of the primary colors red and blue, these signals include components which when properly combined develop a color difference signal G—Y representative of green in the reproduced image. The units 66a and 66b and the voltage divider 67 are effective to derive the latter components in proper proportion from the signals translated through the networks 29b and 29c for combination in the adder circuit 65a to develop the color difference signal G—Y representative of the green of the image. Thus, the network 15″ includes only two signal-detection devices for deriving from the modulated wave signal different modulation components which substantially completely define the chromaticity of the image.

It is helpful to consider a specific example to indicate the manner in which information relative to brightness and the three colors green, red, and blue of an image may be derived from the composite video-frequency signal with the utilization of one channel for developing the brightness signal and only two signal-detection devices for developing the signals representative of the green, red, and blue colors of the image. In a constant-luminance type of color-television receiver such as described in the aforesaid copending application, there are developed color signals G, R, B representative, respectively, of the green, red, and blue colors of the image in the output circuits of the adder circuits **65*a*, 65*b*, and 65*c*,** respectively. The signals G, R, B are developed in the adder circuits just mentioned by combining a brightness signal Y in each of these adder circuits with a color difference signal representative of a component of the chromaticity of the image. As defined by Equation 1 in the aforesaid copending application, the brightness signal M is:

$$M=0.67G+0.30R+0.03B \qquad (1)$$

The reasons for the relative portions of the G, R, B signals which are combined to develop the brightness signal M are fully explained in the copending application and relate to the constant-luminance characteristic of the television system. The brightness signal M defined by Equation 1 is translated through the network 64 and applied to each of the adder circuits **65*a*, 65*b*, and 65*c*.**

In addition to the brightness signal M, there are also applied to the adder circuits **65*a*, 65*b*, and 65*c* signals representative of the chromaticity of the image, specifically, color difference signals $g$, $r$, and $b$. Signals representative of the later signals are defined by Equations 7, 9, and 10 of the copending application as the signals at the output circuits of the detectors 28*a*, 28*b*, and 28*c*** of Fig. 1 of that application. The latter signals modified by the gains of the channels through which they are translated, become the color difference signals $g$, $r$, and $b$ and are defined as follows:

$$g=0.33G-0.30R-0.03B \qquad (2)$$

$$r=0.70R-0.67G-0.03B \qquad (3)$$

$$b=0.97B-0.67G-0.30R \qquad (4)$$

The signals $g$, $r$, and $b$ are applied to the units **65*a*, 65*b*, and 65*c*, respectively. It is apparent that as the signal $g$ is added to the signal M in the unit 65*a* the signal G is developed. Similarly, the signals R and B are developed in the units 65*b* and 65*c*,** respectively.

Signals $r_1$ and $b_1$ representative of $r$ and $b$ prior to the amplification in the units **30*b'* and 30*c'* are derived directly at quadrature phase points, for example, at the 180° and 270° phase points, respectively, of the subcarrier wave signal by the detectors 28*b'* and 28*c'*,** respectively. These signals are defined by Equations 11 and 12 of the above-mentioned copending application and, for the present purpose, may be defined in a rearranged form of the latter equations, as follows:

$$r_1=0.31R-0.30G-0.01B \qquad (5)$$

$$b_1=0.19B-0.13G-0.06R \qquad (6)$$

As described in the copending application, and as is evident from an examination of Equation 2, the signal $g$ is composed of portions of the G, R, and B signals in the proportions expressed by Equation 2. These proportions as defined in one form by Equation 17 in the copending application may be defined as follows:

$$g=-r_1-kb_1 \qquad (7)$$

where $k$ is the fractional portion of the signal $b$ to be combined with the signal $r$ to develop the signal $g$.

As defined by Equation 17 in the copending application:

$$k=0.22 \qquad (8)$$

With such value for $k$, substituting the values of $r_1$ and $b_1$ as defined by Equations 5 and 6, in Equation 7 the signal $g$ as defined by Equation 2 is developed.

To accomplish the operation defined by Equation 7, the phase inverters **66*a* and 66*b* are utilized to develop the signals $-r_1$ and $-b_1$, and the voltage divider 67 is adjusted to apply the fractional portion 0.22 of the signal $-b_1$ to the adder circuit 65*a*, the signal $-r_1$ being applied to the same adder circuit by the unit 66*a*.**

Though the example just considered is directed to the derivation of the signals $-r_1$ and $-kb_1$ by means of actual phase-inverter circuits **66*a* and 66*b* and the voltage divider 67**, as explained in the copending application, at least some of the latter units may be replaced by an asymmetrical arrangement for deriving the signals $g$, $r$, and $b$. Briefly by deriving color difference signals representative of red and blue at the proper phase angles it is possible to cause a color difference signal representative of green to be equal to the inverse of the derived color difference signal representative of red, thereby eliminating the need for more than one phase-inverting circuit.

The embodiment of the invention just described is one wherein information relating to the three primary colors green, red, and blue is derived from the subcarrier wave signal solely by utilizing the two synchronous detectors **28*b'* and 28*c'*.** By utilizing approximately two-thirds of the color-signal detection apparatus that would normally be utilized directly to derive signals representative of the three primary colors, all of the information needed to develop signals representative of the three primary colors is obtained. This information is obtained without any loss in the quality of the image reproduced from the derived signals and with evident increased economy in the number of circuits utilized. Though there has been described a specific system for developing signals representative of the three primary colors from two signals derived from the subcarrier wave signal, it is to be understood that signals other than those described herein as being derived from the subcarrier wave signal may be developed and utilized to provide information relative to the three primary colors in accordance with the teaching of the invention.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A color-signal detection system for a three-color television receiver comprising: a first circuit for supplying a signal primarily representative of the brightness of a televised color image; a second circuit for supplying a wave signal effectively having amplitude modulation components at different phase points thereof representative of individual ones of signals defining the chromaticity of said image; a generator for developing a signal having a frequency which is an integral multiple of the frequency of said wave signal; a signal-detection apparatus including as detectors for the modulation components of said wave signal only two signal-detection devices for deriving from said wave signal different modulation components which substantially completely define said chromaticity of said image, including a signal-translating system coupled to said second circuit for applying said wave signal to said devices and a signal-translating system coupled to said generator for applying said generated signal to said devices, said signal-translating systems having different signal-translating characteristics for causing the phase of the signals translated therethrough to be so modified that said generated signal is in phase with a predetermined phase of said wave signal as applied to one of said devices and is substantially in quadrature phase with said predetermined phase of said wave signal as applied to said other of said devices, whereby said different modulation components are individually derived substantially from quadrature-phase points of said wave signal; and a signal-combining means responsive jointly to said brightness signal and said derived modulation components for developing at least three effects for use by a three-color display of a three-color television receiver.

2. A color-signal detection system for a three-color television receiver comprising: a first circuit for supplying a signal primarily representative of the brightness of a televised color image; a second circuit for supplying a wave signal effectively having amplitude-modulation components at different phase points thereof representative of individual ones of signals defining the chromaticity of said image; a generator for developing a signal having a frequency the same as the frequency of said wave signal; a signal-detection apparatus including as detectors for the modulation components of said wave signal only two signal-detection devices for deriving from said wave signal different modulation components which substantially completely define said chromaticity of said image, including a signal-translating system coupled to said second circuit for applying said wave signal to said devices and a signal-translating system coupled to said generator for applying said generated signal to said devices, said signal-translating systems having different signal-translating characteristics for causing the phase of the signals translated therethrough to be so modified that said generated signal is in phase with a predetermined phase of said wave signal as applied to one of said devices and is substantially in quadrature phase with said predetermined phase of said wave signal as applied to said other of said devices, whereby said different modulation components are individually derived substantially from quadrature-phase points of said wave signal; and a signal-combining means responsive jointly to said brightness signal and said derived modulation components for developing at least three effects for use by a three-color display of a three-color television receiver.

3. A color-signal detection system for a three-color television receiver comprising: a first circuit for supplying a signal M primarily representative of the brightness of a televised color image; a second circuit for supplying a wave signal effectively having amplitude-modulation components at different phase points thereof representative of individual ones of color difference signals *g*, *r*, and *b* defining the chromaticity of said image in terms of green, red, and blue, respectively; a generator for developing a signal having a frequency which is an integral multiple of the frequency of said wave signal; a signal-detection apparatus including as detectors for the modulation components of said wave signal only two signal-detection devices for deriving from said wave signal only two of said color difference signals *g*, *r*, and *b*, including a signal-translating system coupled to said second circuit for applying said wave signal to said devices and a signal-translating system coupled to said generator for applying said generated signal to said devices, said signal-translating systems having different signal-translating characteristics for causing the phase of the signals translated therethrough to be so modified that said generated signal is in phase with a predetermined phase of said wave signal as applied to one of said devices and is substantially in quadrature phase with said predetermined phase of said wave signal as applied to said other of said devices, whereby said two of said color difference signals *g*, *r*, and *b* are individually derived substantially from quadrature-phase points of said wave signal; a signal-combining apparatus responsive to at least one of said two of said color difference signals *g*, *r*, and *b* for developing the third thereof; and a signal-combining means responsive jointly to said brightness signal and said derived modulation components for developing at least three effects for use by a three-color display of a three-color television receiver.

4. A color-signal detection system for a three-color television receiver comprising: a first circuit for supplying a signal primarily representative of the brightness of a televised color image; a second circuit for supplying a wave signal effectively having amplitude-modulation components at different phase points thereof representative of individual ones of signals defining the chromaticity of said image; a sine-wave signal generator for developing a signal having a frequency which is an integral multiple of the frequency of said wave signal; a signal-detection apparatus including as detectors for the modulation components of said wave signal only two signal-detection devices for deriving from said wave signal different modulation components which substantially completely define said chromaticity of said image, including a signal-translating system coupled to said second circuit for applying said wave signal to said devices and a signal-translating system coupled to said generator for applying said generated signal to said devices, said signal-translating systems having different signal-translating characteristics for causing the phase of the signals translated therethrough to be so modified that said generated signal is in phase with a predetermined phase of said wave signal as applied to one of said devices and is substantially in quadrature phase with said predetermined phase of said wave signal as applied to said other of said devices, whereby said different modulation components are individually derived substantially from quadrature-phase points of said wave signal; and a signal-combining means responsive jointly to said brightness signal and said derived modulation components for developing at least three effects for use by a three-color display of a three-color television receiver.

5. A color-signal detection system for a three-color television receiver comprising: a first circuit for supplying a signal primarily representative of the brightness of a televised color image; a second circuit for supplying a wave signal effectively having amplitude-modulation components at different phase points thereof representative of individual ones of signals defining the chromaticity of said image; a generator for developing a signal having a frequency which is an integral multiple of the frequency of said wave signal; a signal-detection apparatus including as detectors for the modulation components of said wave signal only two signal-detection devices for deriving from said wave signal different modulation components which substantially completely define said chromaticity of said image, including a signal-translating system coupled to said second circuit for applying said wave signal to said devices and a signal-translating system coupled to said generator for applying said generated signal to said devices, said signal-translating systems having different signal-translating characteristics for causing the phase of the signals translated therethrough to be so modified that said generated signal is in phase with a predetermined phase of said wave signal as applied to one of said devices and is substantially in quadrature phase with said predetermined phase of said wave signal as applied to said other of said devices, whereby said different modulation components are individually derived substantially from quadrature-phase points of said wave signal; and a plurality of adder circuits individually responsive jointly to said brightness signal and different ones of said derived modulation components for developing at least three effects for use by a three-color display of a three-color television receiver.

6. A color-signal detection system for a three-color television receiver comprising: a first circuit for supplying a signal M primarily representative of the brightness of a televised color image; a second circuit for supplying a wave signal effectively having amplitude-modulation components at different phase points thereof representative of individual ones of color difference signals *g*, *r*, and *b* defining the chromaticity of said image in terms of green, red, and blue, respectively; a generator for developing a signal having a frequency the same as that of said wave signal; a first signal-detection device coupled to said second circuit and to said generator and responsive jointly to said wave signal and said developed signal for deriving from said wave signal at one phase point thereof a component representative of said color difference signal *r*; a second signal-detection device coupled to said second circuit and to said generator and responsive jointly to said wave signal and said developed signal for deriving from said wave signal at another phase point thereof a component representative of said color difference signal *b*; a signal-developing apparatus responsive jointly to said derived signals representative of said color difference signals *r* and *b* for developing a component representative of said color difference signal *g*; and a signal-combining system responsive jointly to said brightness signal M and said derived and developed components representative of said color difference signals *r*, *b*, and *g* for developing at least three effects for use by a three-color display of a three-color television receiver.

7. A color-signal detection system for a three-color television receiver comprising: a first circuit for supplying a signal M primarily representative of the brightness of a televised color image; a second circuit for supplying a wave signal effectively having amplitude-modulation components at different phase points thereof representative of individual ones of color difference signals *g*, *r*, and *b* defining solely the chromaticity of said image in terms of green, red, and blue, respectively; a generator for developing a signal having a frequency the same as that of said wave signal; a first signal-detection device coupled to said second circuit and to said generator and responsive jointly to said wave signal and said developed signal for deriving from said wave signal at one phase point thereof a component representative of said color difference signal *r*; a second signal-detection device coupled to said second circuit and to said generator and responsive jointly to said wave signal and said developed signal including a circuit for delaying the phase of one of said wave signal and said developed signal for deriving from said wave signal at a phase point thereof in quadrature with said one phase point a component representative of said color difference signal *b*; a signal-developing apparatus responsive jointly to said derived signals representative of said color difference signals *r* and *b* for developing a component representative of said color difference signal *g*; and a signal-combining system responsive jointly to said brightness signal M and said derived and developed components representative of said color difference signals *r*, *b*, and *g* for developing at least three effects for use by a three-color display of a three-color television receiver.

8. A color-signal detection system for a three-color television receiver comprising: a first circuit for supplying a signal M primarily representative of the brightness of a televised color image; a second circuit for supplying a wave signal effectively having amplitude-modulation components at different phase points thereof representative of individual ones of color difference signals *g*, *r*, and *b* defining solely the chromaticity of said image in terms of green, red, and blue, respectively; a generator for developing a signal having a frequency the same as that of said wave signal; a first signal-detection device coupled to said second circuit and to said generator and responsive jointly to said wave signal and said developed signal for deriving from said wave signal at one phase point thereof a component representative of said color difference signal *r*; a second signal-detection device coupled to said second circuit and to said generator and responsive jointly to said wave signal and said developed signal for deriving from said wave signal at another phase point thereof a component representative of said color difference signal *b*; a signal-developing apparatus including a phase inverter responsive to one of said derived signals representative of said signals *r* and *b* and an adder circuit coupled to said phase inverter for developing a component representative of said signal *g*; and a signal-combining system responsive jointly to said brightness signal M and said derived and developed components representative of said color difference signals *r*, *b*, and *g* for developing at least three effects for use by a three-color display of a three-color television receiver.

9. A color-signal detection system for a three-color television receiver comprising: a first circuit for supplying a signal M primarily representative of the brightness of a televised color image; a second circuit for supplying a wave signal effectively having amplitude-modulation components at different phase points thereof representative of individual ones of color difference signals *g*, *r*, and *b* defining solely the chromaticiy of said image in terms of green, red, and blue, respectively; a generator for developing a signal having a frequency the same as that of said wave signal; a first signal-detection device coupled to said second circuit and to said generator and responsive jointly to said wave signal and said developed signal for deriving from said wave signal at one phase point thereof a component representative of said color difference signal *r*; a second signal-detection device coupled to said second circuit and to said generator and responsive jointly to said wave signal and said developed signal for deriving from said wave signal at another phase point thereof a component representative of said color difference signal *b*; a signal-developing apparatus responsive jointly to said derived signals representative of said color difference signals *r* and *b* for developing a component representative of said color difference signal *g*; and a plurality of adder circuits individually responsive jointly to said brightness signal M and different ones of said derived and developed components representative of said color difference signals *r*, *b*, and *g* for developing at least three effects for use by a three-color display of a three-color television receiver.

10. A color-signal detection system for a three-color television receiver comprising: a first circuit for supplying a signal primarily representative of the brightness of a televised color image; a second circuit for supplying a wave signal effectively having amplitude modulation components at different phases thereof representative of individual ones of a plurality of color-difference signals defining the chromaticity of said image; a generator for developing a signal having a frequency the same as that of said wave signal; a first signal-detection device coupled to said second circuit and to said generator and responsive to said wave signal and said developed signal for deriving from one phase of said wave signal a component representative of one of said color-difference signals; a second signal-detection device coupled to said second circuit and to said generator and responsive jointly to said wave signal and said developed signal for deriving from another phase of said wave signal a component representative of another of said color-difference signals; a signal-developing apparatus responsive jointly to said derived signals representative of said color-difference signals for developing a component representative of a third of said color-difference signals; and a signal-combining system responsive jointly to said brightness signal and said derived and developed components representative of said color-difference signals for developing at least three effects for use by a three-color display of a three-color television receiver.

11. A color-signal detection system for a three-color television receiver comprising: a first circuit for supplying a signal primarily representative of the brightness of a televised color image; a second circuit for supplying a wave signal effectively having amplitude modulation components at different phases thereof representative of individual ones of a plurality of color-difference signals defining the chromaticity of said image; a generator for developing a signal having a frequency the same as that of said wave signal; a first synchronous detector coupled to said second circuit and to said generator and responsive to said wave signal and said developed signal for deriving from one phase of said wave signal a component representative of one of said color-difference signals; a second synchronous detector coupled to said second circuit and to said generator and responsive jointly to said wave signal and said developed signal for deriving from another phase of said wave signal a component representative of another of said color-difference signals; a signal-developing apparatus responsive jointly to said derived signals representative of said color-difference signals for developing a component representative of a third of said color-difference signals; and a signal-combining system responsive jointly to said brightness signal and said derived and developed components representative of said color-difference signals for developing at least three effects for use by a three-color display of a three-color television receiver.

References Cited in the file of this patent

UNITED STATES PATENTS

| | | |
|---|---|---|
| 2,554,693 | Bedford | May 29, 1951 |
| 2,558,489 | Kalfaian | June 26, 1951 |
| 2,580,903 | Evans | Jan. 1, 1952 |
| 2,635,140 | Dome | Mar. 14, 1953 |
| 2,664,462 | Bedford | Dec. 29, 1953 |